US010598256B2

(12) United States Patent
Hummel

(10) Patent No.: US 10,598,256 B2
(45) Date of Patent: Mar. 24, 2020

(54) DUAL CLUTCH TRANSMISSION FOR A MOTOR VEHICLE

(71) Applicant: AUDI AG, Ingolstadt (DE)

(72) Inventor: Steffen Hummel, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 309 days.

(21) Appl. No.: 15/551,443

(22) PCT Filed: Jan. 20, 2016

(86) PCT No.: PCT/EP2016/051114
§ 371 (c)(1),
(2) Date: Aug. 16, 2017

(87) PCT Pub. No.: WO2016/131597
PCT Pub. Date: Aug. 25, 2016

(65) Prior Publication Data
US 2018/0038450 A1 Feb. 8, 2018

(30) Foreign Application Priority Data
Feb. 19, 2015 (DE) .................. 10 2015 002 134

(51) Int. Cl.
*F16H 3/00* (2006.01)
*F16H 3/089* (2006.01)
*F16H 3/08* (2006.01)

(52) U.S. Cl.
CPC ............. *F16H 3/006* (2013.01); *F16H 3/089* (2013.01); *F16H 2003/0803* (2013.01);
(Continued)

(58) Field of Classification Search
CPC . F16H 3/093; F16H 3/006; F16H 3/10; F16H 37/043; F16H 2003/007
(Continued)

(56) References Cited

U.S. PATENT DOCUMENTS 7,421,919 B2* 9/2008 Gumpoltsberger ..... F16H 3/006
74/330
7,472,617 B2* 1/2009 Nicklass ................ F16H 3/006
74/331
(Continued)

FOREIGN PATENT DOCUMENTS

DE 102011089167 A1 6/2013
DE 102012013248 A1 1/2014
(Continued)

OTHER PUBLICATIONS

Notification of Transmittal of Translation of the International Preliminary Report on Patentability dated Aug. 24, 2017, in connection with corresponding international application No. PCT/EP2016/051114 (20 pages).

(Continued)

*Primary Examiner* — Ha Dinh Ho
(74) *Attorney, Agent, or Firm* — Maier & Maier, PLLC

(57) ABSTRACT

A dual clutch transmission for a motor vehicle. A gearwheel set switchable via switching elements, which form eight wheel planes and which are respectively assigned to a first sub-transmission and to a second sub-transmission, among which each sub-transmission is provided with an input shaft and both sub-transmissions are provided with a common output shaft. The input shafts, which are coaxial to each other, can be alternately activated via a load-shiftable clutch, and the even forward gears are assigned to the first sub-transmission, while the odd forward gears are assigned to the second sub-transmission, which are shiftable during a gear switch via the switching elements. The input shafts are free of the rotationally fixed gearwheels of the wheel planes arranged thereupon.

13 Claims, 2 Drawing Sheets

(52) U.S. Cl.
CPC .............. *F16H 2003/0818* (2013.01); *F16H 2003/0822* (2013.01); *F16H 2003/0826* (2013.01); *F16H 2200/0078* (2013.01)

(58) Field of Classification Search
USPC .................................. 74/330, 331, 333, 340
See application file for complete search history.

(56) References Cited

U.S. PATENT DOCUMENTS

| | | | | |
|---|---|---|---|---|
| 7,886,626 | B2* | 2/2011 | Bjorck | F16H 3/006 |
| | | | | 74/330 |
| 8,117,932 | B2* | 2/2012 | Bjorck | F16H 3/006 |
| | | | | 74/329 |
| 8,438,941 | B2* | 5/2013 | Mellet | F16H 3/006 |
| | | | | 74/330 |
| 2004/0093972 | A1* | 5/2004 | Gumpoltsberger | F16H 3/006 |
| | | | | 74/325 |

FOREIGN PATENT DOCUMENTS

| | | |
|---|---|---|
| DE | 102012220675 A1 | 5/2014 |
| WO | 2016/023792 A1 | 2/2016 |

OTHER PUBLICATIONS

International Search Report dated May 4, 2016 of corresponding International application No. PCT/EP2016/051114; 22 pgs.

* cited by examiner

Fig. 2

| G | K1 | K2 | RE-1 | RE-2 | RE-3 | RE-4 | RE-5 | RE-6 | RE-7 | RE-8 | SE-A | SE-B | SE-C | SE-D | SE-E | SE-F |
|---|---|---|---|---|---|---|---|---|---|---|---|---|---|---|---|---|
| 1 | X | | | | | | | | | | re | | | | | |
| 1 | | X | X | X | | | X | | | | | iii | iii | re | | |
| 2 | | X | X | X | X | | | | | | | | iii | | | |
| 3 | X | | | | | | X | | | | iii | iii | | | | |
| 3 | | X | | | X | | X | | | | | | re | | | |
| 4 | | X | X | | | | | | | | re | | re | re | | |
| 5 | X | | | | | | | | X | | iii | | iii | | iii | iii |
| 6 | | X | | | | | | X | | X | | | | | | iii |
| 7 | X | | | X | | | | | X | X | re | re | re | | iii | iii |
| 8 | | X | | | | X | | X | | | | | iii | iii | | |
| 9 | X | | X | X | | | | | X | X | iii | re | | | | |
| 10 | X | | | | | X | | | | | | | re | re | | |
| 11 | X | | | | | | | | | | iii | | iii | | | |
| 12 | | X | | | | | | X | | | | | re | | | |

DUAL CLUTCH TRANSMISSION FOR A MOTOR VEHICLE

FIELD

The present invention relates to a dual clutch transmission.

Such dual clutch transmissions have in addition to a good efficiency and other advantages also the advantage that they are automatically switchable without an interruption of the tractive force, wherein a gear stage can be preselected already in a respective non-activated sub-transmission, which is then activated by the selection of the load-shiftable clutches. In this case, the odd gears (1, 3, 5, etc.) are positioned in one sub-transmission, and in another sub-transmission are positioned the even gears (2, 4, 5, etc.) by means of corresponding gearwheel sets, which are for example drivingly connected via synchronous clutches to the respective input shafts or output shafts.

The object of the invention is to provide a dual clutch transmission which provides with a structurally advantageous construction with a greater degree of freedom and functionality (shifting strategy) and which has an advantageous design of the gear stages.

According to the current dual clutch transmissions, fixed gear wheels of the respective wheel planes are arranged on the input shafts of the first sub-transmission and of the second sub-transmission in a rotationally fixed manner. In order to ensure a flawless torque flow during the driving operation with a dual clutch transmission, the inputs shafts must be appropriately designed in a materially intensive manner. In addition, all the fixed gear wheels of the respectively activated input shafts rotate during the driving operations, which results in a high inertial torque of the activated sub-transmission.

SUMMARY OF THE DISCLOSURE

According to the characterizing part of the present invention, the input shafts are completely free of the rotationally fixed gears of the wheel planes RE-1 through RE-8 arranged thereupon. Each of the input shafts is provided with one switching element SE-A and SE-C, which can be in particular switched on both sides in the axial direction. By means of the first switching element SE-C, the first input shaft can be coupled to or decoupled from all of the wheel planes RE-1 through RE-4 of the first sub-transmission A. By means of the second switching element SE-A, the second input shaft can be coupled to or decoupled from all the wheel planes RE-5 through RE-8.

Therefore, according to the invention, both of the coaxial input shafts are no longer provided with fixed gearwheels, but only with the first and the second switching element. The input shaft can thus be designed in this manner with a substantially reduced material amount in comparison to the prior art mentioned above. In addition, by means of the first and of the second switching element SE-C and SE-A, the wheel planes can be decoupled at least partially in the respectively activated sub-transmissions from the torque flow (which is to say deactivated), so that the inertial torque of the activated sub-transmission can be reduced. This leads to a shortening of the switching time periods during a switching process, or to a reduction of the energy amount required for the switching operation.

The first switching element SE-C, which is arranged in the first sub-transmission, can be in a technical implementation designed so that it is switchable on both sides in the axial direction. In this case, the first switching element SE-C of the first sub-transmission A can be coupled to the loose gearwheel of a first wheel plane RE-1 that is mounted on the drive side on the first input shaft, or it can be coupled to the hollow shaft coaxially mounted on the first input shaft. The drive-side hollow shaft, which is rotatably mounted on the first input shaft, can support at least one, preferably two drive-side fixed gearwheels, which are respectively associated with a second wheel plane RE-2 and with a third wheel plane RE-3.

In a technical implementation, a drive-side gearwheel of a fourth wheel plane RE-4 can be additionally mounted on the hollow shaft of the first sub-transmission A. For a driving connection to the hollow shaft, it can be provided with a third switching element SE-D, by means of which the loosely mounted drive-side gearwheel of the fourth wheel plane RE-4 can be coupled to the drive-side hollow shaft of the first sub-transmission A.

In a further development of the invention, a fifth wheel plane RE-5, which is immediately adjacent in the axial direction to the first sub-transmission A, is assigned to the second sub-transmission B. The fifth wheel plane RE-5 can be provided with a drive-side gearwheel, which is mounted on the second input shaft and which can be preferably coupled by means of the upper third switching element SE-D to the drive-side hollow shaft of the first sub-transmission A. The fifth wheel plane RE-5 can thus be in this manner switched to both partial transmissions A, B.

The second switching element SE-A, which is supported by the second input shaft, can be switched in the axial direction on both sides (for example as a dual synchronizing clutch). In this case, a drive-side loose gearwheel of an eighth wheel plain RE-8 can be mounted on the second input shaft in the second sub-transmission B on both sides of the switching element SE-A in the axial direction and a coaxially mounted drive-side hollow shaft can be arranged on the second input shaft. The drive-side hollow shaft and the upper loose gearwheel of the eighth wheel plane can be alternately coupled to the second input shaft (by means of the second switching element SE-A). The drive-side hollow shaft of the second sub-transmission B can preferably support a drive-side fixed gearwheel of the sixth wheel plane RE-6. In order to switch the drive-side loose wheel of the sixth wheel plane RE-6, the hollow shaft can be provided with a fourth switching element SE-B, by means of which the loosely mounted drive-side gearwheel of the sixth wheel plane can be coupled to the second sub-transmission. In a preferred embodiment, the drive-side, loosely mounted gearwheel can be coupled by means of the fourth switching element SE-B mentioned above to the drive-side gearwheel of the fifth wheel plane RE-5, which can be switched to both sub-transmission A, B.

In a technical implementation, the drive shaft is arranged axially parallel to the input shaft. It is preferred when the drive-side gearwheels of the first and second wheel plane RE1, RE-2 are arranged non-rotatably in the first sub-transmission A on a drive-side hollow shaft which is coaxially and rotatably mounted on the drive shaft. The output shaft can in addition be provided with a fifth switching element SE-F, by means of which the drive-side hollow shaft or an output-side gearwheel of the third wheel plane RE-3 can be coupled alternately to the output haft in the first sub-transmission.

In a similar manner as in the first sub-transmission, the output-side gearwheels of the seventh and eighth wheel plane RE-7, RE-8 can be also arranged on the output-side hollow shaft which is rotatably arranged coaxially on the output-side shaft. The hollow shaft, which is rotatably mounted in the second sub-transmission B, can be coupled with the aid of a sixth, one-sided switching element SE-E with the output shaft.

In an embodiment variant, the drive-side gearwheel can be non-rotatably arranged for both of the sub-transmissions A, B on the switchable fifth wheel plane RE-5 as a fixed gearwheel on the output shaft. In this case, the fifth wheel plane RE-5 would constantly rotate during the driving operation and possibly prematurely wear out the rotary bearings. Against this background, the output gearwheel of the fifth wheel plane RE-5 can be also mounted on the output shaft and it can be coupled via a seventh switching element SE-G to the output shaft.

As was mentioned above, at least one gearwheel set can be coupled via a shifting clutch to the other sub-transmission. In this manner, with a small additional technical and operational expense and without giving up the advantage of acceleration of the motor vehicle that is free of interruptions of tractive force, so that at least one forward gear can be skipped, which is to say for example that it is possible to shift from an odd forward gear without a delay to the next odd forward gear. In particular with a strong mechanization of the motor vehicle and with defined driving conditions, this can enable improved acceleration occurring without switching delays.

It is particularly preferred when the gearwheel set forms at least the 3rd forward gear of the sub-transmission, which can be drivingly connected, directly or indirectly, to the input shaft of one of the partial transmissions A, B. The result is that in addition to the regular switching strategy, it is possible to switch from the 1st gear to the 3rd gear and when required also from this gear to the 5th gear without an interruption in the tractive force.

If in the case of a corresponding technical design of the transmission said gearwheel set is also incorporated in the power flow of the 1st forward gear, the sub-transmission can be switched also here, so that an additional degree of freedom in functionality can be obtained.

In a preferred embodiment of the invention, the fixed gearwheel can belong to a gearwheel set that is switchable to both sub-transmission and that can be arranged on the common drive shaft of the changeover gearbox, while the corresponding switchable loose gearwheel can be coupled in a technically simple manner to the switching element SE-D of the sub-transmission A or with the switching element SE-B to the sub-transmission B. The switching elements can in this case be dual clutches, by means of which a gearwheel set of one of the sub-transmissions or of the gearwheel set can be switched to the other sub-transmission.

In a preferred embodiment of the invention, only eight gear planes can be used with a 12-gear transmission with the multiple use of the gearwheel sets, wherein the commonly used gearwheel set of one of the sub-transmissions is arranged immediately adjacent to the other sub-transmission. The construction of the changeover gearbox can thus be relatively small and it can be provided with a very small number of switching elements and gear adjusting stages.

Moreover, fixed gearwheels of several wheel and gear planes of both sub-transmissions can be attached to a common hollow shaft and this shaft can be rotatably mounted on a common output shaft, as well as coupled via shifting clutches (which is to say switching elements) to the output shaft.

In addition, other fixed gearwheels of the gear planes can be arranged on a hollow shaft which is mounted of the input shaft of one sub-transmission and which can be coupled by means of a shifting clutch to said gearwheel of another sub-transmission.

Finally, the twelve forward gears can be switched with as small gear technology expense as possible by means of five dual clutches and a simple clutch, wherein four dual clutches are positioned on both coaxially arranged input shafts of the sub-transmission and a simple clutch is arranged on the common output shaft.

BRIEF DESCRIPTION OF THE DRAWING

An embodiment of the invention will now be described in more detail in the following based on the attached figures. The figures show the following:

FIG. 2 shows a switching matrix of the speed-change gearbox according to FIG. 1.

DETAILED DESCRIPTION OF THE DRAWING

Figure 1:
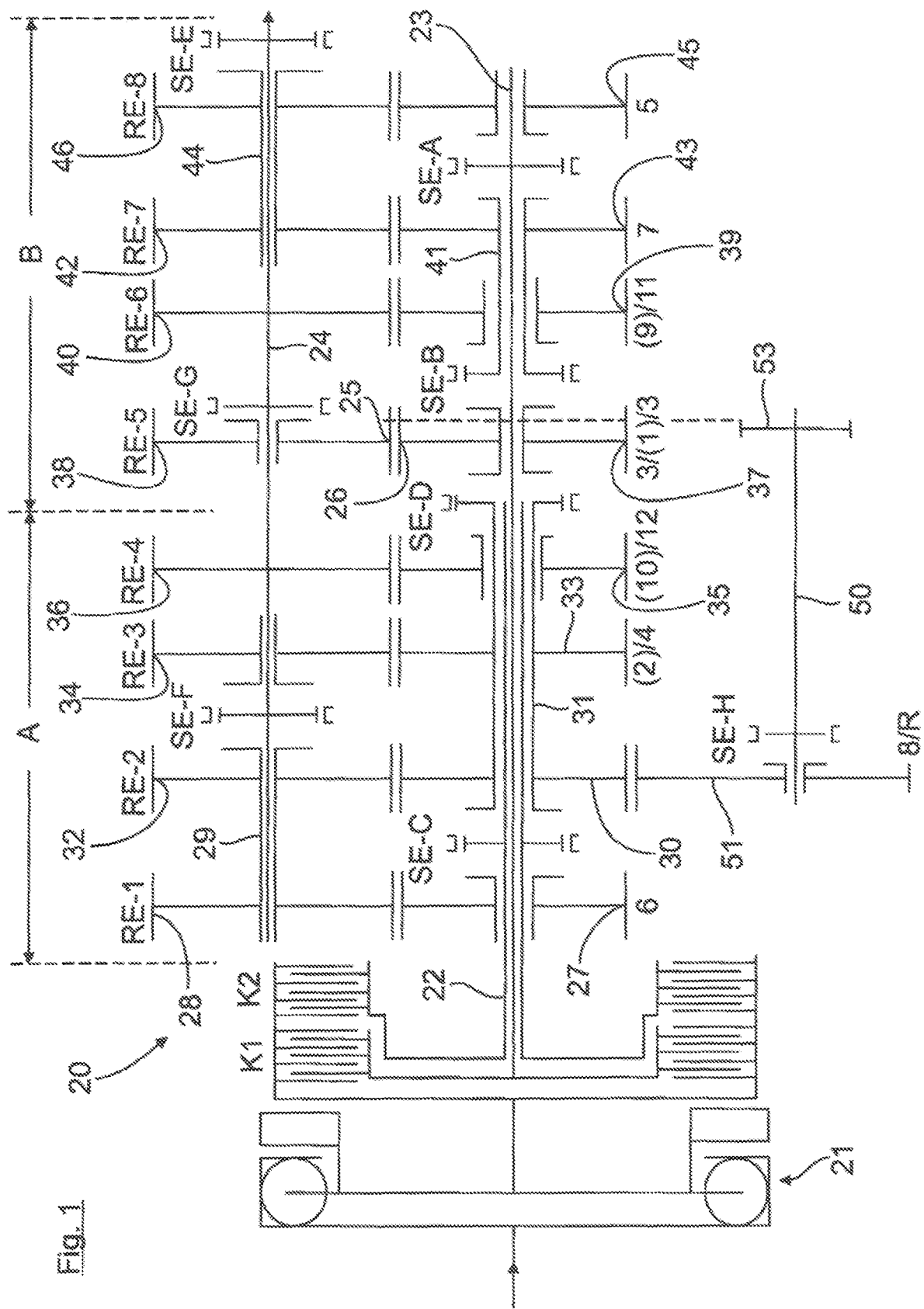
FIG. 1 shows a block circuit diagram of a speed-change gearbox for motor vehicles with two sub-transmissions which can be activated via two load-shiftable forward gears, wherein a gearwheel of the transmission can be used for both sub-transmissions.

FIG. 1 shows a speed-change gearbox or a dual clutch 20 for a motor vehicle, by means of which up to twelve forward gears 1 through 12, arranged in eight wheel planes or provided with eight gearwheel sets RE-1 through 12, can be switched. Each of the wheel planes RE-1 through RE-8 consists of a drive-side gearwheel arranged coaxially to an input shaft 22, 23 and to an output-side gearwheel arranged coaxially to an output shaft 24.

The changeover gearbox 20 is arranged, or the wheel planes RE-1 through RE-8 are arranged in a per se known manner by means of switchable loose gearwheels and fixed gearwheels on the input shafts 22, 23 and on a common output shaft 24 in a manner that will be described later, wherein the gearwheel sets RE-1 through RE-4 form a first sub-transmission A and the gearwheels RE-5 through RE-8 form a second sub-transmission B.

The gearwheel set RE-5 of the sub-transmission B is arranged with a loose gearwheel 38 on the output shaft 24 and with a switchable loose gearwheel 26 on the input shaft 23 arranged axially immediately adjacent to the sub-transmission A in such a way that its loose switchable gearwheel 26 can be coupled via a shifting clutch SE-D either to the sub-transmission A, or via a shifting clutch SE-B to the sub-transmission B.

The arrangement of the remaining gearwheels can be realized in such a way that the 12 forward gears can be realized with only eight gearwheel sets RE-1 through RE-8, wherein:

- the loose gearwheel 27 of RE-1 is arranged on the input shaft 22 and its fixed gearwheel 28 is arranged non-rotationally on the hollow shaft 29 which is mounted coaxially to the output shaft 24.
- a fixed gearwheel 30 of RE-2 is mounted via a hollow shaft 31 on the input shaft 22 and the corresponding fixed gearwheel 32 is also mounted non-rotatably on the hollow shaft 29;
- the loose gearwheel 27 and the hollow shaft 31 can be coupled by means of a shifting clutch SE-C alternately to the input shaft 22;
- a fixed gearwheel 33 of RE-3 is arranged on the hollow shaft 31, while its loose gearwheel 34 or the hollow shaft 29 can be alternately coupled via a shifting clutch SE-F to the output shaft 24;

on the hollow shaft 31 is further mounted a loose gearwheel 35 of the gearwheel set RE-4, which meshes with a fixed gearwheel 36 on the output shaft 24;

immediately axially adjacent to the loose gearwheel 35 of the gearwheel set RE-4 is located the loose gearwheel 37 of the gearwheel set RE-5 on the central input shaft 23 of the sub-transmission B, which is in engagement with the other loose gearwheel 38 on the output shaft 24;

both loose gearwheels 35, 37 can be coupled via another shifting clutch SE-D alternately to the hollow shaft 31 of the input shaft 22;

in addition, the loose gearwheel 37 can be coupled via a second shifting clutch SE-B to a hollow shaft 41 mounted on one of the input shafts 23, wherein the hollow shaft 41 supports a loose gearwheel 39 of the gearwheel set RE-6, which can be also coupled via the shifting clutch SE-B to the hollow shaft 41;

the loose gearwheel 39 of the gearwheel set RE-6 meshes with another fixed gearwheel 40 on the output shaft 24;

the hollow shaft 41 is further provided with a fixed gearwheel 43 of the gearwheel RE-7, which is in engagement with a gearwheel 42 with a hollow shaft 44 that is rotatably mounted on one of the output shaft 24, the hollow shaft 41 on the input shaft 23 can be further connected via a shifting clutch SE-A to the input shaft 23, wherein the shifting clutch SE-A alternately couples also a loose gearwheel 45 of the gearwheel set RE-8 to the input shaft 23;

the fixed gearwheel 46 of the gearwheel set RE-8 is analogously to the fixed gearwheel 42 of the RE-7 arranged on the hollow shaft 44, wherein the hollow shaft 44 can be connected via a simple shifting clutch SE-E to the output drive 24.

The shifting clutches SE-C, SE-F, SE-D, SE-B and SE-A can be designed as known dual synchronizing clutches that are customary with shifting clutches (with a position of the sliding clutch shown in FIG. 1 on the left (li), or on the right (re), and with the shifting clutch SE-E designed as a simple synchronizing clutch (switching position Ii)), which are electronically controlled or switched via corresponding electrically/hydraulically activated actuators each time from a neutral position (as shown).

The clutches K1, K2 can be switched with hydraulically, load-shiftable lamellar clutches, which alternately activate the sub-transmission A or B according to a corresponding preselection of the shift into the drive force flow.

The forward gears 1 through 12, (a reverse gear, which may be necessary, is not shown in the figure to simplify the explanation), can be shifted according to the switching matrix of FIG. 2, wherein the respectively switched gears (G) 1 through 12 are shown in the left column of the matrix. The x marks denote the gearwheel sets RE1 through RE8 that are integrated in the force flow and the designation (li) or (re) designates the switching positions of the respective shifting clutches SE. It should be noted that the gears 1 and 3 in the column G are indicated twice because they can be switched selectively via the sub-transmission B (clutch K1), or via the sub-transmission A (clutch K2).

The regular shifting sequence can be 1-2-3-4-5 ff., wherein the 1st gear is activated via the clutch K1 (sub-transmission B) and the other gears are shifted by alternately closing the clutches K1, K2, etc. As is known, the next gear can be preselected in the sub-transmission with the open clutch, so that during switching, the clutches K1, K2 can be shifted without interrupting the tractive force.

In the modified shifting sequence, the 2nd gear, and when appropriate also the 4th gear, can be skipped without interrupting the tractive force, wherein the force flow is controlled in the 1st gear via the clutch K1 or K2 (sub-transmission A or B), with a corresponding integration of the gearwheel sets RE-1 through RE-8 and with the positioning of the switching clutches SE (see matrix). The result is that the 3rd gear, and when appropriate also the 5th gear, is already preselected and thus can be activated with the change of the load-shiftable clutch without interrupting the tractive force.

Therefore, in addition to the regular shifting sequence of the dual clutch transmission 20, the modified shifting sequences 1-3-4-5-6 ff can be controlled in the sequence K2, K1, K2, K1, K2 ff., or 1-3-5-6 ff., in the sequence K1, K2, K1, K2 ff, wherein the shifting sequences can be present and/or manually adjusted depending on the operating data and on the driving parameters of the motor vehicle via an electronic transmission control.

As can be further also seen from the switching matrix of FIG. 2, the forward gears 3 through 8, as well as gears 11 and 12, are designed as direct gears which are provided with exactly one wheel plane connected in the torque flow. In contrast to that, the forward gears 1, 2 and 9 as well as 10 are not designed as direct gears, but are realized as twist gears, in which by means of the switching element SE-a through SE-G, three wheel planes are combined and connected in series in the torque flow. By way of an example, the first, second and third wheel planes RE-1, RE-2, RE-3 are connected into the torque flow in the 1st forward gear. In the 9th forward gear (twist gear) are connected the eighth, seventh and sixth wheel plane R-8, RE-7, RE-6. With an engaged 10th forward gear (twist gear), the first, second and fourth wheel planes RE-1, RE-2 and RE-4 are connected.

In order to provide the respective twist-forward gears 1, 2 and 9 as well as 10, the three wheel levels to be connected are either completely assigned to the first sub-transmission A, or completely assigned to the second sub-transmission B. This means that when the twist forward gear is connected, only the sub-transmission that is provided with the three twist wheel planes is integrated into the torque flow of the engaged gear, while the other sub-transmission is fully decoupled from the torque flow.

In order to form a reverse gear R, a reverse gear shaft 50 bridging over both sub-transmissions A, B is mounted axially parallel to the input shaft 22, 23 and to the output shaft 24 in the transmission housing, not shown, of the dual clutch transmission. The reverse gear shaft 50 supports two reversing gearwheels 51, 53 among which the first reversing gearwheel 51 meshes with the drive-side gearwheel 30 of the second wheel plane RE-2 and the second reversing gearwheel 53 meshes with the drive side gearwheel 37 of the fifth wheel plane RE-5.

The first reversing gearwheel 51, which cooperates with the second wheel plane RE-2 of the sub-transmission A, is designed as a loose gearwheel and it can be coupled by means of a switching element SE-H that is switchable on one side to the reverse gear shaft 50. The reverse gearwheel 53 that is cooperating with the fifth wheel plane RE-5 is on the other hand designed as a fixed gearwheel.

The gearwheel R is activated by switching the switching element SE-C supported by the first input shaft in FIG. 1 to the left to the drive-side gearwheel 30 of the first wheel plane RE-1. In addition, the switching element SE-H is switched to the left to the first reversing gearwheel 51, and the output-side gearwheel 38 of the intermediated wheel plane RE-5 is coupled via the shifting element SE-G to the output shaft 24. The reverse gear R is therefore a twist gear, wherein the torque flow is transmitted with the closed separating clutch K2 via a hollow input shaft 22, and the drive-side gearwheel 30 of the second wheel plane RE-2 is shifted to the reversing gearwheel 51 and further via the reverse gear shaft 50 as well as the second reversing gearwheel 53 to the output gearwheel 38 of the intermediate wheel plane RE-5.

The invention claimed is:

1. Dual clutch transmission for a motor vehicle, comprising:
a plurality of gearwheel sets, which form exactly eight wheel planes switchable by switching elements and arranged in a sequence in an axial direction from an input side to an output side of the dual clutch transmission from the first to the eighth wheel plane arranged one after another, which are respectively assigned to a first sub-transmission and to a second sub-transmission, among which the first sub-transmission is provided with a first input shaft and the second sub-transmission is provided with a second input shaft, and both sub-transmissions are provided with a common output shaft, wherein the input shafts, which are coaxial to each other, can be alternately activated by means of a load-shiftable clutch, and wherein the first sub-transmission are assigned the even forward gears and the second sub-transmission is assigned the odd forward gears, which can be shifted with a gear shift via the switching elements, wherein a first gearwheel set of the first through the fourth wheel plane form the first sub-transmission and a second gearwheel set of the fifth through the eighth wheel plane form the second sub-transmission, wherein the input shafts are free of rotationally fixed wheel planes arranged thereupon, wherein each input shaft is provided with exactly one switching element switchable on both sides in particular in the axial direction, and by the first switching element the first input shaft can be coupled directly or indirectly to all of the first through the fourth wheel planes of the first sub-transmission or decoupled therefrom, and by the second switching element the second input shaft can be coupled directly or indirectly to all of the fifth through eight wheel planes of the second sub-transmission or decoupled therefrom.

2. The dual clutch transmission according to claim 1, further comprising:
a drive-side loose gearwheel of a wheel plane, which is mounted on the first input shaft of the first sub-transmission, is arranged in the axial direction on both sides of the first switching element and a drive-side hollow shaft is coaxially mounted on the first input shaft, which can be alternately coupled to via the first switching element to the first input shaft, and the drive-side hollow shaft of the sub-transmission supports at least one fixed gearwheel of the second or third wheel plane.

3. The dual clutch transmission according to claim 2, wherein a drive-side gearwheel of the fourth wheel plane is loosely mounted on the drive-side hollow shaft of the first sub-transmission, and the drive-side hollow shaft of the first sub-transmission is provided with a third switching element, by which the loosely mounted drive-side of the fourth wheel plane can be coupled to the drive-side hollow shaft.

4. The dual clutch transmission according to claim 3, wherein the second sub-transmission is provided with a fifth wheel plane immediately adjacent to the first sub-transmission in the axial direction, and the fifth wheel plane can be coupled by the third switching element to the first sub-transmission.

5. The dual clutch transmission according to claim 4, wherein on both sub-transmissions is loosely mounted a switchable fifth wheel plane with its drive-side gearwheel on the second input shaft, and the drive-side gearwheel of the fifth wheel plane, which is switchable to both sub-divisions, can be coupled by means of the third switching element to the hollow shaft of the first sub-division.

6. The dual clutch transmission according to claim 1, wherein in the axial direction on both sides of the second switching element of the second sub-division is arranged a loose gearwheel of the eighth wheel plane, mounted on the second input shaft of the second sub-transmission and a drive-side hollow shaft is arranged coaxially mounted on the second input shaft, and hat drive-side loose gearwheel of the eighth wheel plane and the drive-side hollow shaft of the second sub-transmission can be alternately coupled via the second switching element to the second input shaft, and the drive-side hollow shaft of the second sub-transmission supports at least one fixed gearwheel of the seventh wheel plane.

7. The dual clutch transmission according to claim 5, wherein a drive-side gearwheel of the sixth wheel plane is loosely mounted on the drive-side hollow shaft of the second sub-transmission, and the drive-side hollow shaft of the second sub-transmission is provided with a fourth switching element, by which the loosely mounted drive-side gearwheel of the sixth wheel plane can be coupled to the drive-side hollow shaft of the second sub transmission.

8. The dual clutch transmission according to claim 7, wherein the drive-side gearwheel of the fifth gearwheel plane, which can be switched to both sub-transmissions, can be coupled by the fourth switching element to the drive-side hollow shaft of the second sub-transmission.

9. The dual clutch transmission according to claim 1, wherein the output shaft is arranged axially parallel to the first and to the second input shaft, and the output-side gearwheels of the first and second wheel planes of the first sub-transmission are non-rotatably arranged on an output-side hollow shaft of the first sub-transmission, which is coaxially and rotatably mounted on the output shaft.

10. The dual clutch transmission according to claim 1, wherein the output shaft is provided with a fifth switching element, by which the drive-side hollow shaft of the first sub-division can be alternately coupled to the first sub-transmission, or an output-side gearwheel loosely mounted on the output shaft of the third wheel plane can be coupled to the output shaft.

11. The dual clutch transmission according to claim 1, wherein the drive-side gearwheels of the seventh and eighth wheel plane of the second sub-transmission are non-rotatably arranged on an output-side hollow shaft of the second sub-transmission, which is rotationally and coaxially mounted on the output shaft.

12. The dual clutch transmission according to claim 11, wherein the output-side shaft is provided with a switching element by means of which the drive-side hollow shaft of the second sub-transmission can be coupled to the output shaft.

13. The dual clutch transmission according to claim 1, a drive-side gearwheel of the fifth wheel plane, which is switchable to both sub-transmission, is arranged non-rotatably as a fixed gearwheel on the output side, or that the output-side gearwheel of the fifth wheel plane is loosely mounted on the output shaft and can be coupled via a seventh switching element to the output shaft.

* * * * *